United States Patent
Goldstein

(10) Patent No.: US 11,064,832 B1
(45) Date of Patent: Jul. 20, 2021

(54) PARCEL LOCKER SYSTEMS

(71) Applicant: Avraham Goldstein, Flushing, NY (US)

(72) Inventor: Avraham Goldstein, Flushing, NY (US)

( * ) Notice: Subject to any disclaimer, the term of this patent is extended or adjusted under 35 U.S.C. 154(b) by 220 days.

(21) Appl. No.: 16/181,201

(22) Filed: Nov. 5, 2018

Related U.S. Application Data

(60) Provisional application No. 62/584,068, filed on Nov. 9, 2017.

(51) Int. Cl.
| | |
|---|---|
| *A47G 29/14* | (2006.01) |
| *G06Q 10/08* | (2012.01) |
| *A47G 29/30* | (2006.01) |
| *A47C 7/62* | (2006.01) |

(52) U.S. Cl.
CPC ............ *A47G 29/141* (2013.01); *A47C 7/628* (2018.08); *A47G 29/30* (2013.01); *G06Q 10/0836* (2013.01); *A47G 2029/144* (2013.01)

(58) Field of Classification Search
CPC .................. A47G 29/141; A47G 29/30; A47G 2029/144; A47G 2029/148; A47G 2029/149; A47C 7/628; G06Q 10/0836; G07C 9/00896; G07C 9/00912
USPC ...................... 232/17, 19, 34–36, 45; 340/569
See application file for complete search history.

(56) References Cited

U.S. PATENT DOCUMENTS

| | | | | |
|---|---|---|---|---|
| 6,967,575 | B1* | 11/2005 | Dohrmann | A47G 29/141 220/592.01 |
| 2013/0147626 | A1* | 6/2013 | Hammoud | A47G 29/1214 340/569 |
| 2016/0066733 | A1* | 3/2016 | Gozar | G06Q 10/0833 232/18 |
| 2017/0124510 | A1* | 5/2017 | Caterino | G07C 9/00896 |
| 2018/0070753 | A1* | 3/2018 | Eveloff | A47G 29/141 |
| 2018/0260777 | A1* | 9/2018 | Judge | G07C 9/00896 |
| 2018/0261030 | A1* | 9/2018 | Arellano | H04N 7/183 |
| 2019/0000255 | A1* | 1/2019 | Dehner | E05B 47/023 |
| 2019/0043298 | A1* | 2/2019 | Moudy | G07C 9/00857 |
| 2019/0180544 | A1* | 6/2019 | Newcomb | E05B 47/0001 |
| 2020/0005238 | A1* | 1/2020 | Richardson | A47G 29/141 |

* cited by examiner

Primary Examiner — William L Miller

(57) ABSTRACT

A parcel locker system is disclosed that includes a rigid container having an external surface, an internal area that is configured to receive and hold a parcel, a door that is configured to be reversibly opened and closed, a door lock that is configured to be wirelessly activated and deactivated, a digital indicator located on the external surface (which signals whether the door lock is activated or deactivated), a means for attaching the rigid container to a floor or wall surface, and a power source. The system further includes a camera that is configured and oriented to capture video content of a delivery person located adjacent to the rigid container and wirelessly transmit such video content. In addition, the system includes a software application that is configured to receive transmitted video content from the camera and, according to a user's command, wirelessly issue an instruction to the door lock to deactivate for a period of time.

4 Claims, 6 Drawing Sheets

PARCEL LOCKER SYSTEMS

CROSS-REFERENCE TO RELATED APPLICATIONS

This application claims priority to U.S. provisional patent application Ser. No. 62/584,068, filed on Nov. 9, 2017.

FIELD OF THE INVENTION

The field of the present invention relates to parcel lockers and related systems, which are configured to securely receive and hold parcels that are delivered to residential and commercial destinations (and which can be remotely and wirelessly controlled).

BACKGROUND OF THE INVENTION

In recent years, e-commerce has fueled incredible growth in consumer purchases of goods that are delivered straight to the customer's home or business. In the infancy of e-commerce, consumers were purchasing books, DVDs, and other small items, which could easily be delivered to the customer's home or business (and, in many cases, deposited within a conventional mail box). As e-commerce has become more accessible and mainstream, the types of goods that are currently purchased by consumers via e-commerce platforms has expanded considerably—e.g., consumer electronics, clothing, and now even food items are being purchased and delivered to a customer's home or business.

The growth in such delivery services has, unfortunately, also given rise to a new form of crime. Specifically, when parcels are delivered to a home or business, if the customer (or other person) is not present in the home or business, the parcel is often left at the doorstep of the home or business. On occasion, thieves will take such parcels, which deprives the customer of the product and, furthermore, creates additional expense for on-line vendors. In addition, when parcels are left at the doorstep of a home or business, the parcels are more susceptible to weather-related damage.

In view of the foregoing, there is a continuing and growing demand for new products and systems that are configured to securely receive and hold parcels (exhibiting a variety of shapes and sizes) that are delivered to residential and commercial destinations.

SUMMARY OF THE INVENTION

According to certain aspects of the present invention, parcel locker systems are provided. More particularly, the parcel locker systems of the present invention include a rigid container that is configured to receive and hold a parcel, which is preferably affixed to a ground or wall surface adjacent to a building (such that the rigid container may not be misappropriated by others). The invention provides that the rigid container may be remotely controlled by a user via a software application housed within a personal computing device (e.g., a smart phone, tablet, or watch). More particularly, the rigid container may be temporarily opened (to allow a delivery person to deposit a parcel therein) through a wireless instruction that is sent by the software application housed within the personal computing device to the rigid container. The invention provides that the system includes at least one camera, which is configured to transmit video content of the area surrounding the rigid container to a user, so that the user may confirm that a legitimate delivery person has arrived to deposit a parcel within the rigid container.

More specifically, according to such embodiments, the invention provides that the parcel locker systems include a rigid container having an external surface, an internal area that is configured to receive and hold a parcel, a door that is configured to be reversibly opened and closed, a door lock that is configured to be wirelessly activated (locked) and deactivated (unlocked), a digital indicator located on the external surface of the rigid container (which signals whether the door lock is activated or deactivated), a means for attaching the rigid container to a floor or wall surface, and a power source. As mentioned above, the system further includes a camera that is configured and oriented to capture video content of a delivery person located adjacent to the rigid container and wirelessly transmit such video content to a user of the system. In addition, the system includes a software application that is configured to receive the transmitted video content from the camera and, according to a user's command, wirelessly issue an instruction to the door lock to deactivate for a period of time (e.g., 30 seconds)—to allow a delivery person to deposit the parcel within the rigid container.

According to additional aspects of the present invention, the parcel locker systems described above are provided, which are embedded within (and, to some extent, disguised within) a piece of outdoor furniture.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

According to certain preferred embodiments of the present invention, parcel locker systems are provided. The parcel locker systems of the present invention include a rigid container that is configured to receive and hold a parcel, with the rigid container being preferably affixed to a ground or wall surface adjacent to a building (e.g., a user's house or place of business). The invention provides that the rigid container may be remotely controlled by a user, via a software application housed within the user's personal computing device. More particularly, the rigid container may be temporarily opened (to allow a delivery person to deposit a parcel therein) through a wireless instruction that is sent by the software application housed within the personal computing device to the rigid container. The invention provides that the system includes at least one camera, which is configured to transmit video content of the area surrounding the rigid container to the user, so that a user may confirm that a delivery person has arrived to deposit a parcel within the rigid container.

Figure 1:
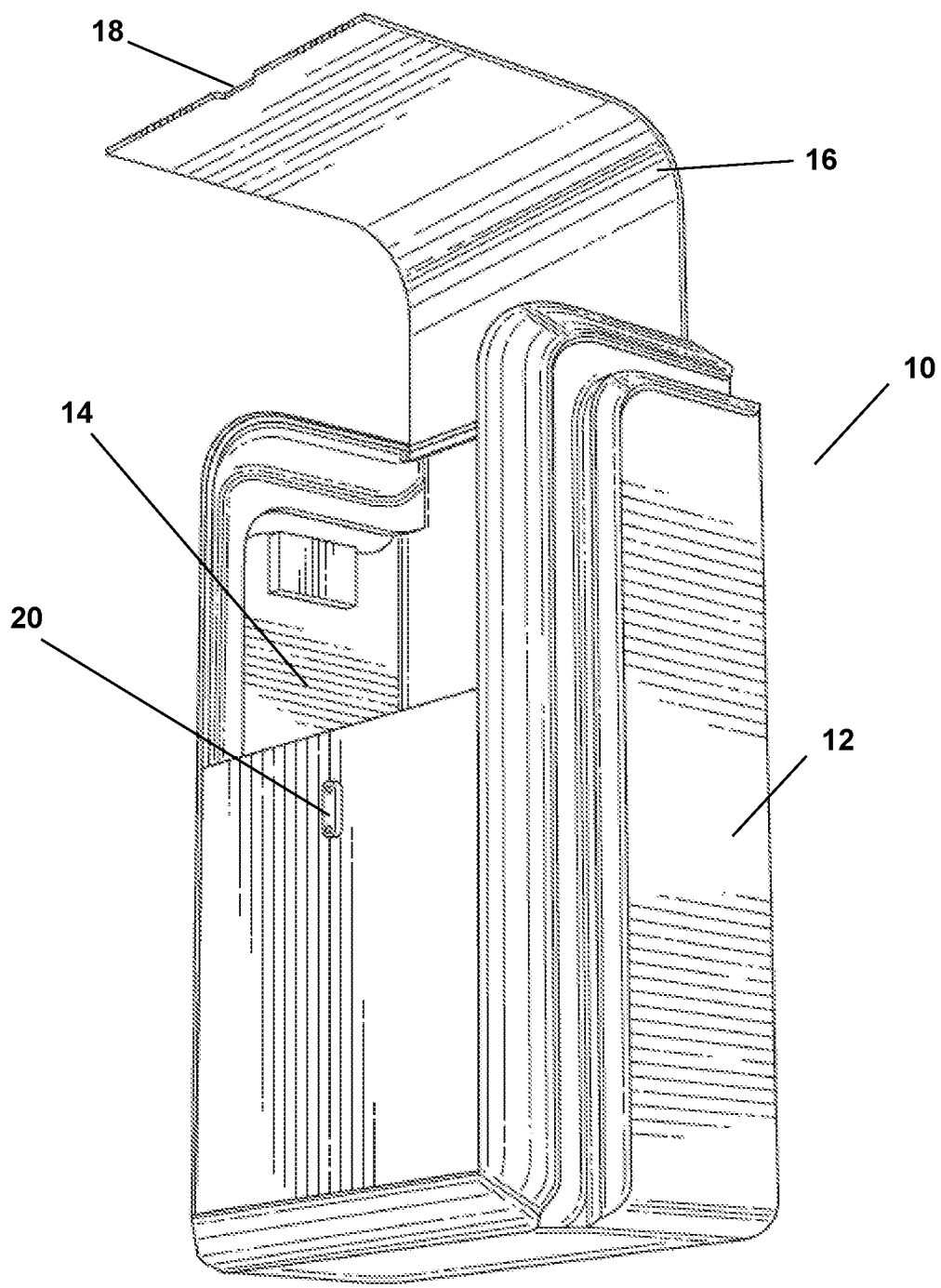
FIG. 1: a perspective side view of a rigid container of the parcel locker system of the present invention, showing the locker door in an open configuration.
Figure 2:
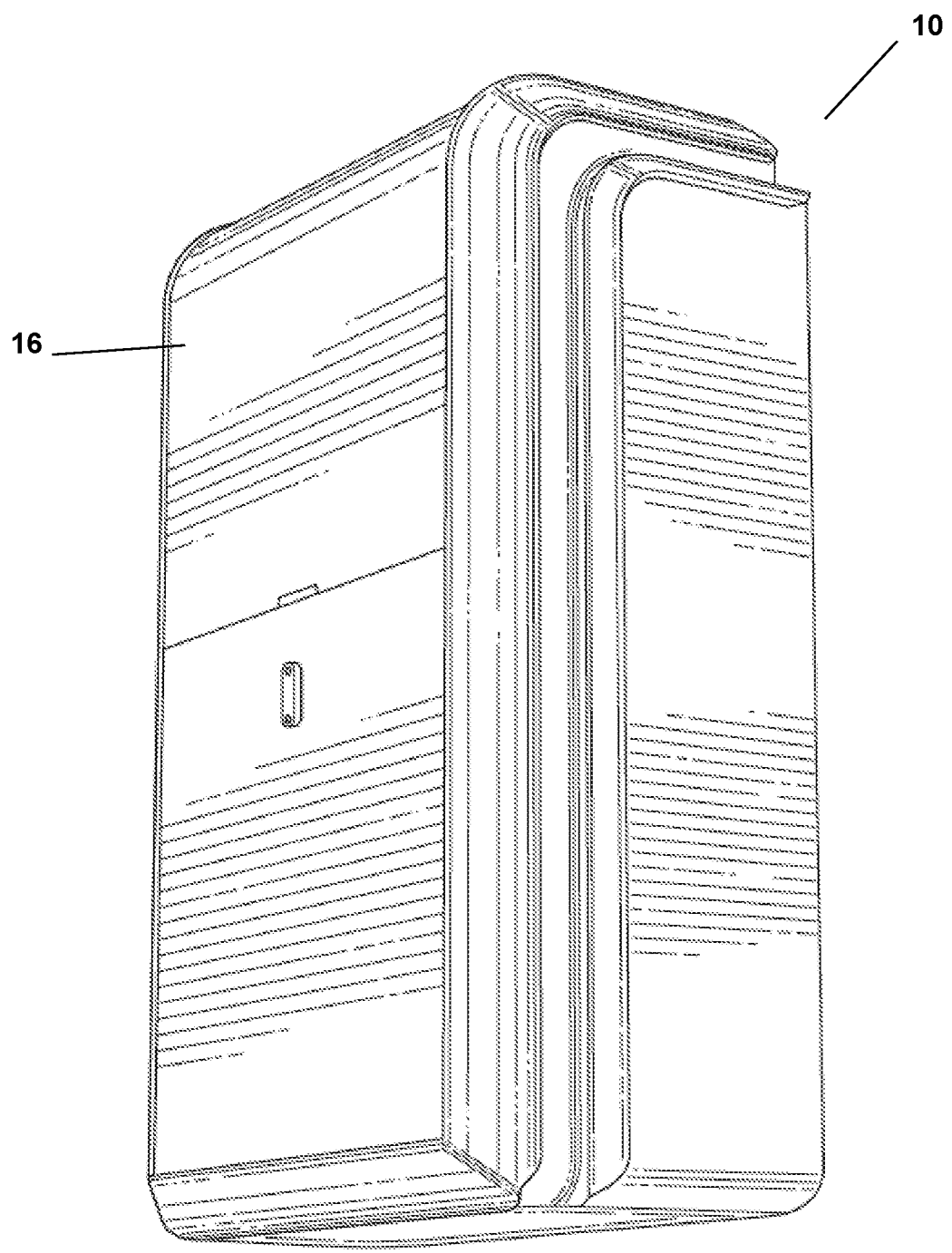
FIG. 2: a perspective side view of a rigid container of the parcel locker system of the present invention, showing the locker door in a closed configuration.
Figure 3:
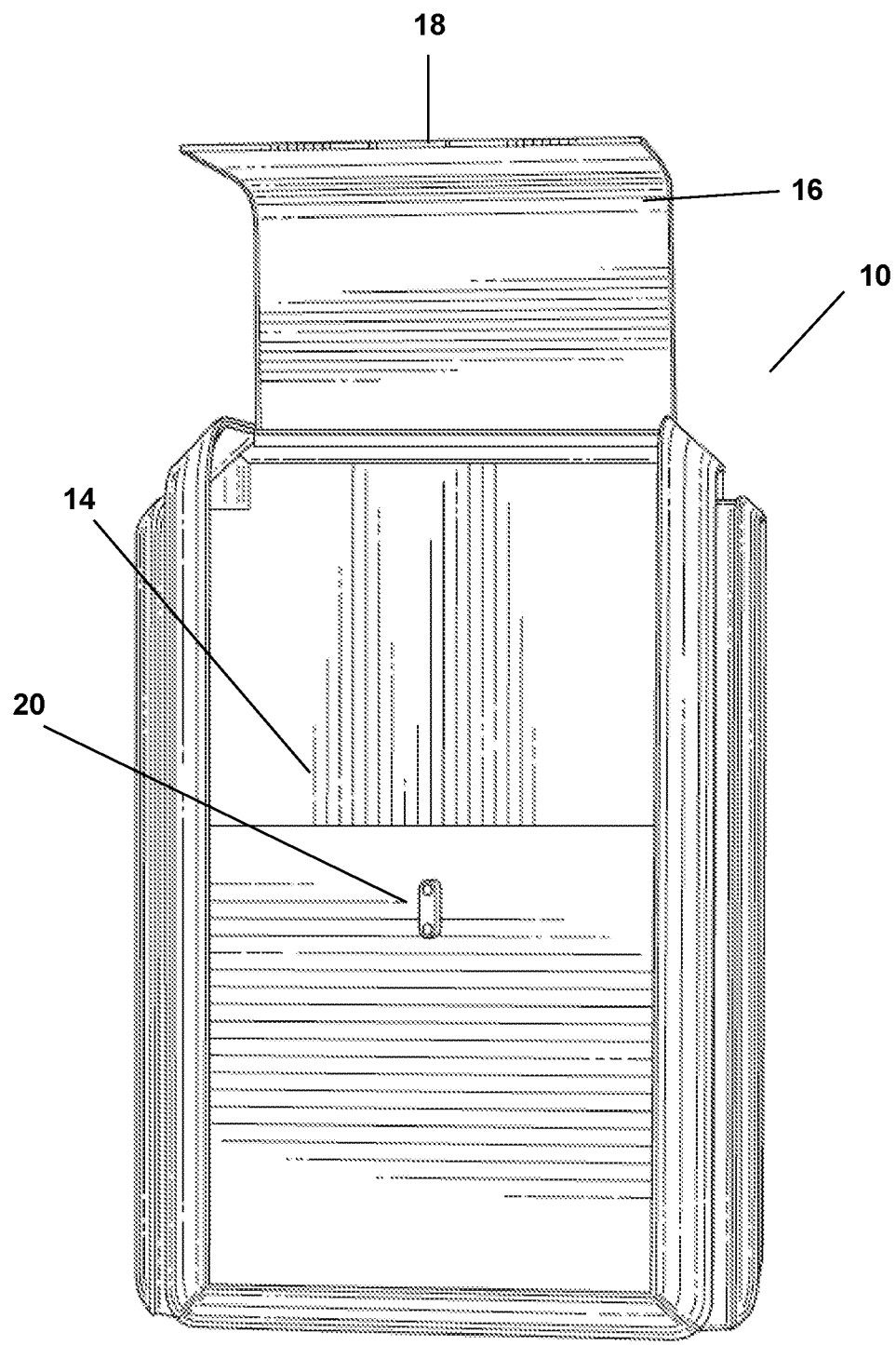
FIG. 3: a front side view of a rigid container of the parcel locker system of the present invention, showing the locker door in an open configuration.
Figure 4:
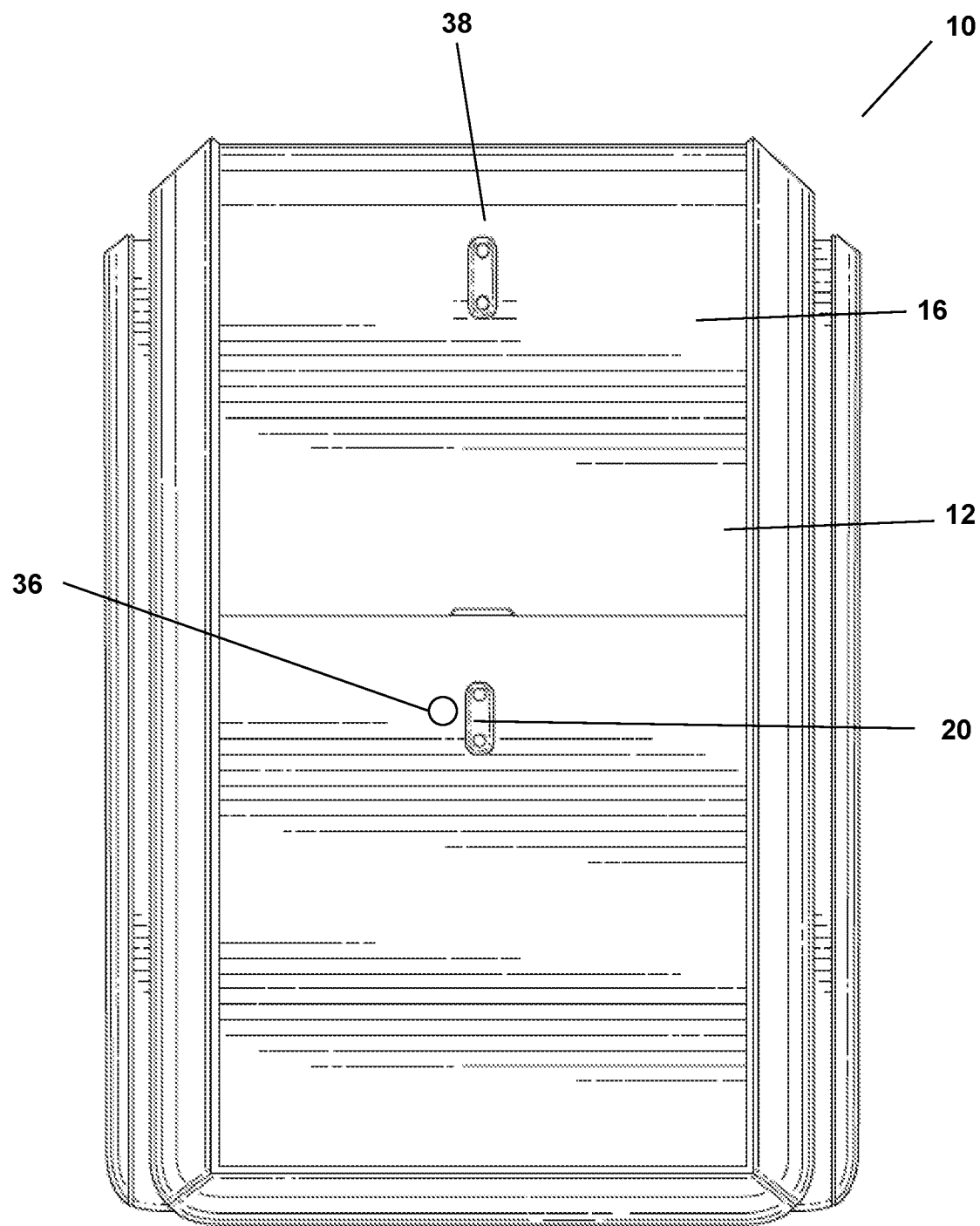
FIG. 4: a front side view of a rigid container of the parcel locker system of the present invention, showing the locker door in a closed configuration.
Figure 5:
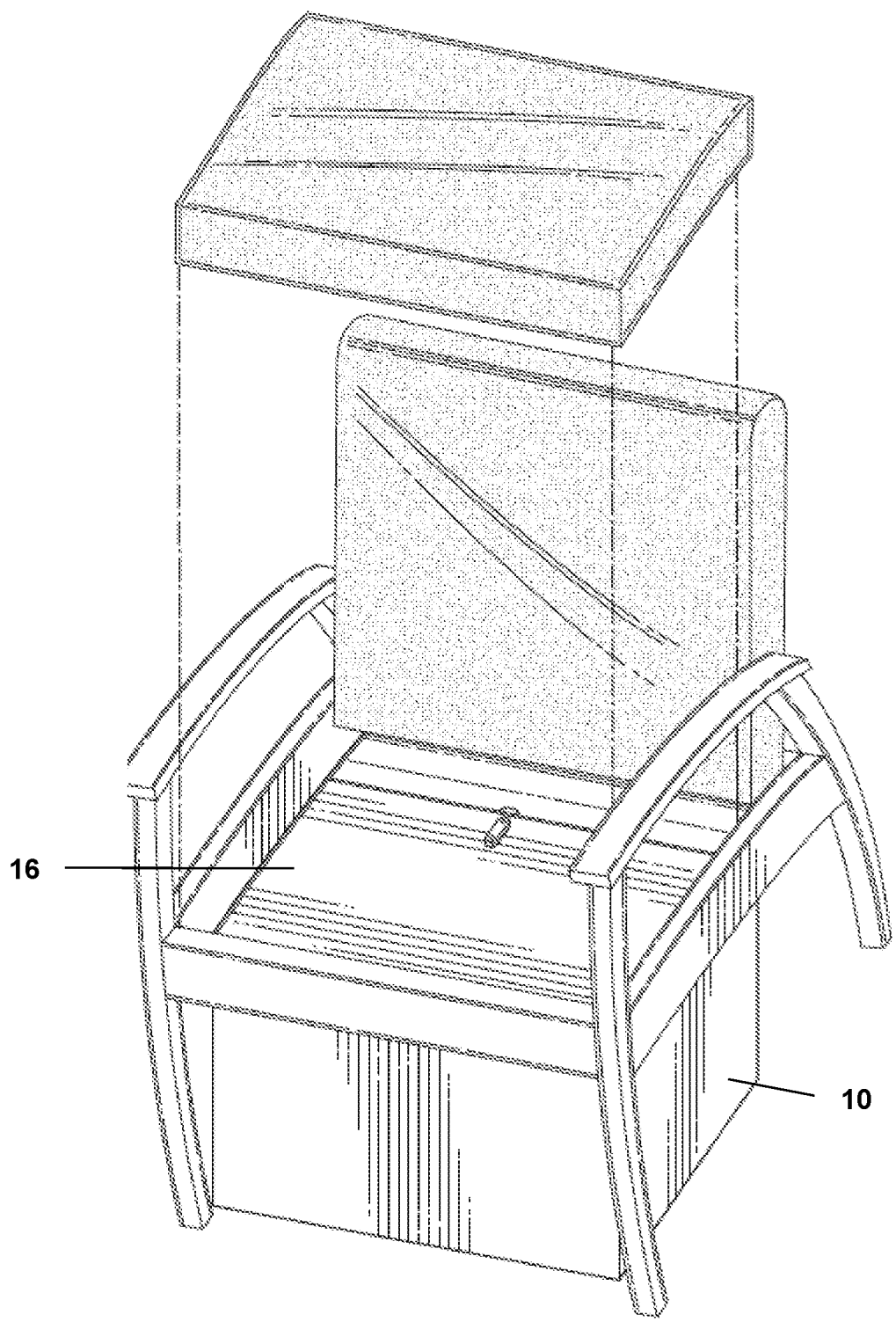
FIG. 5: a perspective view of a rigid container of the parcel locker system of the present invention, which is integrated into a piece of outdoor furniture.
Figure 6:
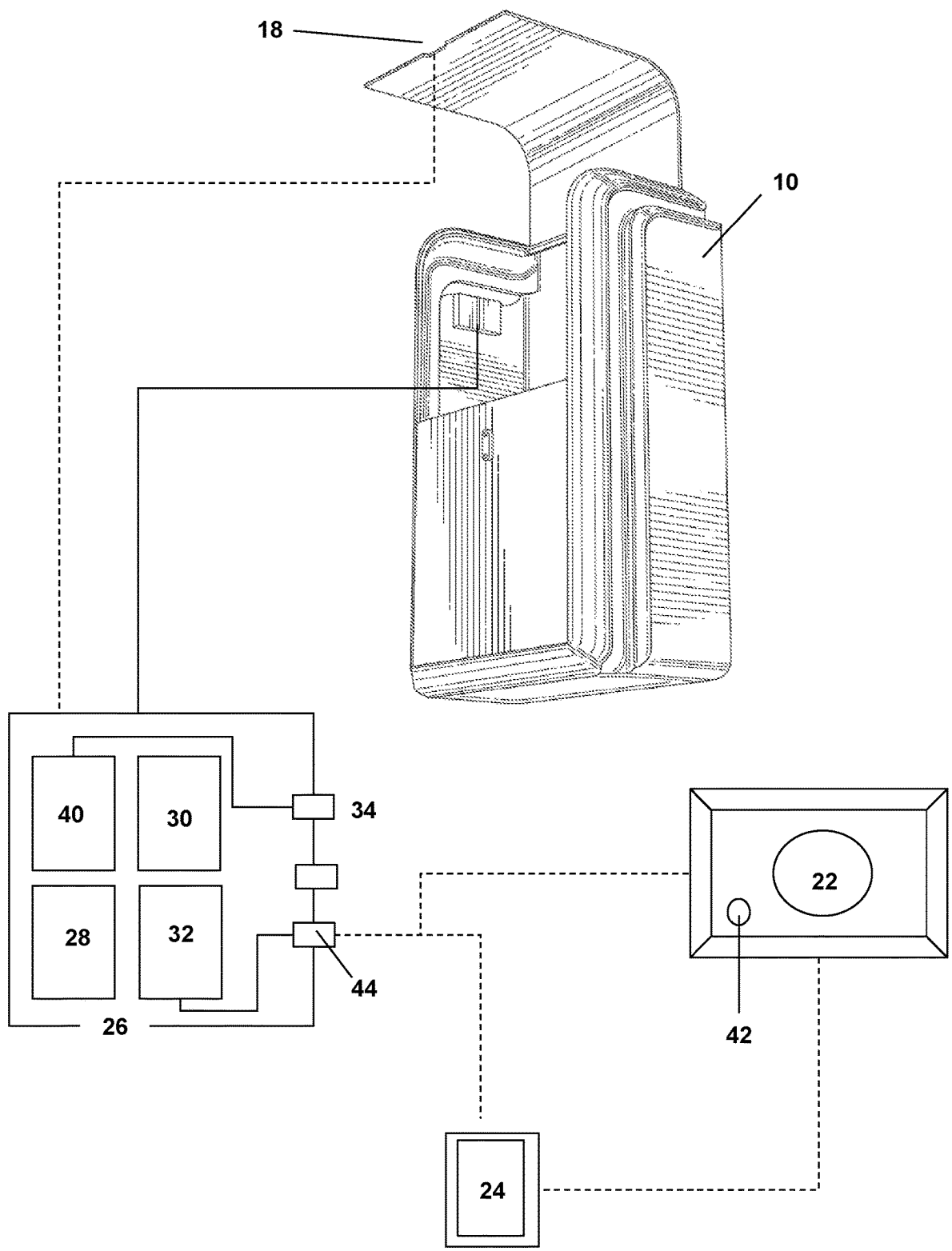
FIG. 6: another perspective view of a rigid container of the parcel locker system of the present invention, along with a diagram showing various parts of the central processing unit of the rigid container, as described herein.

Referring now to FIGS. 1-6, according to certain preferred embodiments of the present invention, the parcel locker systems comprise a rigid container 10 that includes an external surface 12, an internal area 14 that is configured to receive and hold a parcel, a door 16 that is configured to be reversibly opened and closed, a door lock 18 that is configured to be wirelessly activated (closed/locked) and deactivated (opened/unlocked), a digital indicator 20 located on the external surface 12 that signals whether the door lock 18 is activated or deactivated (e.g., the digital indicator 20 may exhibit a red light when the door lock 18 is activated (locked) and a green light when the door lock 18 is deactivated (unlocked), thereby communicating to a delivery person that the door 16 may be opened to deposit a parcel within the rigid container 10), a means for attaching the rigid container 10 to a floor or wall surface, and a power source 40 (FIG. 6).

The invention provides that the means for attaching the rigid container 10 to a floor or wall surface is preferably located on the bottom external surface 12, or back external surface 12, of the rigid container 10. The invention provides that such means for attaching the rigid container 10 to a floor or wall surface may consist of bolts, nails, adhesives, latches, chains, or other mechanical attachments that are effective to connect the rigid container 10 to a floor or wall surface (so that the rigid container 10—and its contents—may not be misappropriated by others). The invention further provides that the power source 40 may consist of (or otherwise be operably coupled to) a rechargeable battery that is housed within the rigid container 10; a hardwire connection 34 to a power line associated with an adjacent building; or a combination of the foregoing.

Referring now to FIG. 6, the parcel locker systems of the present invention further include a camera 22 that is configured and oriented to capture video content of a parcel delivery person located adjacent to the rigid container 10 and wirelessly transmit such video content to a user of the system. The invention provides that the camera 22 may be integrated into or affixed to the rigid container 10, such as positioned on the external surface 12 thereof (and facing outward from the door 16), or integrated into a building that is adjacent to the rigid container 10 (e.g., the camera 22 may consist of a security camera affixed to the building). In both embodiments (i.e., the camera 22 being affixed to the rigid container 10 or an adjacent building), the camera 22 will be configured to wirelessly communicate and transmit video content to a user of the system. The invention provides that such transmission may be executed between the camera 22 and a user's computing device 24 (discussed below) or, in other embodiments, the camera 22 may transmit the video content to a central processing unit 26 (discussed below) of the rigid container 10, which then relays and transmits the video content to the user's computing device 24.

In addition, as explained above, the parcel locker systems of the present invention include a software application that is housed within a user's computing device 24 (such as a mobile phone, tablet, computer, smart watch, or other computing device that is capable of running the software application described herein). The invention provides that the software application—housed within a user's computing device 24—is configured to receive the transmitted video content from the camera 22 (and display such content to the user within the computing device 24). The invention provides that the computing device 24 and software application are configured to, according to the user's command, wirelessly issue an instruction to the door lock 18 to deactivate for a defined period of time, such as 30 seconds (i.e., sufficient time for a delivery person to deposit a parcel within the rigid container 10).

According to yet further embodiments, the camera 22 may optionally include a motion detector 42 that is configured to issue a wireless notification to a user (to the user's computing device 24), indicating that a person has been detected and is present in an area adjacent to the rigid container 10. At such time, the camera 22 captures video content of the person and transmits the video content to the user's computing device 24, whereupon the software application—housed within the user's computing device 24—is configured to prompt the user to either permit or deny access to the internal area 14 of the rigid container 10. For example, in certain embodiments, if the user wishes to grant such access, the user may click/select a button within the user interface of the computing device 24, which causes the software application housed therein to wirelessly issue an instruction to the door lock 18 to deactivate (to allow the door 16 to be opened) for a defined period of time (e.g., 30 seconds). In such embodiments, the door lock 18 is preferably configured to be magnetically activated (closed/locked) and deactivated (opened/unlocked).

According to certain preferred embodiments, the rigid containers 10 of the parcel locker systems of the present invention further include a central processing unit 26, which includes or is operably coupled to the power source 40, a processor 28, a storage medium 30 (e.g., random access memory), a wireless transceiver 32, and an antennae 44. The invention provides that the wireless transceiver 32 and antennae 44 are configured to wirelessly communicate with the software application housed within a user's computing device 24. Such wireless communication may be executed through the wireless transceiver 32 itself and/or via a wireless Internet connection established by a router within an adjacent building.

Referring now to FIG. 4, in certain embodiments, the rigid container 10 may, optionally, further include a microphone and speaker 36 (e.g., on the external surface 12 thereof), which are configured to enable a parcel delivery person, when located adjacent to the rigid container 10, to verbally communicate with a user/second person who is operating the software application housed within a user's computing device 24. In addition, according to some embodiments, the invention provides that the rigid container 10 may, optionally, include a second digital indicator 38 located on the external surface 12 that is configured to signal that a parcel is present within the internal area 14 and automatically reset when a user retrieves the parcel by opening the door 16 using the software application housed within a user's computing device 24 (e.g., a green light may indicate that a parcel is present within the rigid container 10, whereas a red light may indicate that no parcel is present).

According to yet further embodiments, the present invention provides that the software application housed within a user's computing device 24 may be configured to issue electronic reminders that a parcel has been deposited within the rigid container 10. For example, the software application may issue an electronic notice or reminder that a parcel has been deposited within the rigid container 10 (and the date and time of such deposit) via e-mail, short message service (SMS) messaging (i.e., text messages), through a user's on-line website portal, or such other electronic forms of communication that may be viewed within the user's computing device 24. In addition, if the power source 40 of the rigid container 10 consists of a rechargeable battery, the invention provides that the software application will further be configured to communicate, using any of the above communication protocols, the amount of remaining battery charge (and/or when the rechargeable battery should be re-charged using an external power source).

According to yet further embodiments, the invention provides that the rigid container 10 of the parcel locker system may include a motor that is configured to automatically close the door 16 after a defined period of time (e.g., 30 seconds) has elapsed. For example, in the event that a parcel delivery person forgets to manually close the door 16 after depositing a parcel within the rigid container 10, the motor will be activated by the central processing unit 26 to cause the door 16 to close and the door lock 18 to be activated. The invention provides that the software application is preferably configured to allow a user to prescribe and adjust (as desired) the duration of the defined period of time during which the door 16 is allowed to remain in an opened state.

The invention provides that the rigid containers 10 of the present invention may exhibit a variety of shapes and sizes, but will preferably exhibit an internal area 14 that is configured to receive and hold both large and small parcels. For example, if the rigid containers 10 are configured to exhibit a substantially rectangular outer dimension, the rigid containers 10 will preferably be configured to include an internal area 14 that is capable of receiving and holding a parcel that consists of at least 1 cubic foot, or preferably at least 2 cubic feet, or, in some embodiments, at least 3 cubic feet. In certain embodiments, depending on the size and volume of the internal area 14, the internal area 14 may include one or more adjustable shelves. The invention provides that the external surface 12 of the rigid container 10 is preferably "water tight"—meaning that, when the door 16 is closed, rain and other weather elements are not able to enter the internal area 14 of the rigid container 10. The invention provides that the rigid container 10 may be manufactured from a variety of rigid materials, such as steel, plastics, elastomers, and other rigid and weather-resistant materials.

Referring now to FIG. 5, in certain preferred embodiments, the rigid container 10 described herein may be embedded within (and, to some extent, disguised within) a piece of outdoor furniture. For example, the rigid container 10 may be integrally formed between (or attached to) four legs of a porch chair or bench. In such embodiments, the door 16 of the rigid container 10 may be accessed and opened by pulling back (or removing) a seat cushion of the outdoor furniture. The invention provides that the outdoor furniture may be configured such that the sides of the rigid container 10 are viewable between the legs of the furniture (as shown in FIG. 5) or not viewable between the legs of the furniture (e.g., enclosed by a wall that connects the legs of the furniture). Although a porch chair is depicted in FIG. 5, the invention provides that the rigid containers 10 described herein may be embedded within a variety of other types of furniture or outdoor fixtures.

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A parcel locker system, which comprises:
   (a) a rigid container that includes an external surface, an internal area that is configured to receive and hold a parcel, a door that is configured to be reversibly opened and closed, a door lock that is configured to be wirelessly activated and deactivated, a first digital indicator located on the external surface that signals whether the door lock is activated or deactivated, a means for attaching the rigid container to a floor or wall surface, and a power source;
   (b) a camera that is configured and oriented to (i) capture video content of a parcel delivery person located adjacent to the rigid container and (ii) wirelessly transmit said video content;
   (c) a software application that is configured to (i) receive transmitted video content from the camera, (ii) wirelessly communicate with the door lock, (iii), according to a user's command, wirelessly issue an instruction to the door lock to deactivate for a defined period of time, and (iv) issue electronic reminders to the user that a parcel has been deposited within the rigid container;
   (d) a microphone and speaker, which are configured to enable the parcel delivery person, when located adjacent to the rigid container, to verbally communicate with the user who is operating the software application;
   (e) a second digital indicator located on the external surface of the rigid container that is configured to (i) signal that a parcel is present within the internal area and (ii) automatically reset when the user retrieves the parcel by opening the door using the software application; and
   (f) a motor that is configured to automatically close the door after the defined period of time has elapsed.

2. The parcel locker system of claim 1, wherein the camera is (a) integrated into the rigid container or (b) integrated into a building that is adjacent to the rigid container.

3. The parcel locker system of claim 2, wherein the power source is (a) a rechargeable battery, (b) a hardwire connection to a power line associated with the building, or (c) a combination of (a) and (b).

4. The parcel locker system of claim 3, wherein the door lock is configured to be magnetically activated and deactivated.

* * * * *